United States Patent
Cheng et al.

(10) Patent No.: US 8,350,727 B2
(45) Date of Patent: Jan. 8, 2013

(54) TOUCH PANEL AND ELECTRONIC DEVICE INCLUDING THE SAME

(75) Inventors: Jia-Shyong Cheng, Miao-Li County (TW); Jeah-Sheng Wu, Miao-Li County (TW); Chun-Yi Hu, Miao-Li County (TW); Chih-Han Chao, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 253 days.

(21) Appl. No.: 12/826,580

(22) Filed: Jun. 29, 2010

(65) Prior Publication Data

US 2011/0006925 A1 Jan. 13, 2011

(30) Foreign Application Priority Data

Jul. 8, 2009 (CN) .......................... 2009 1 0304144

(51) Int. Cl.
*H03M 11/00* (2006.01)
*G06F 3/041* (2006.01)
(52) U.S. Cl. ......................................... 341/20; 345/173
(58) Field of Classification Search .................... 341/20; 345/173–174; 178/18.01
See application file for complete search history.

(56) References Cited

U.S. PATENT DOCUMENTS

| 8,017,884 B2 * | 9/2011 | Huang et al. .................. 200/600 |
| 2009/0102810 A1 * | 4/2009 | Jiang et al. ..................... 345/173 |

FOREIGN PATENT DOCUMENTS

TW 200920689 A 5/2009

\* cited by examiner

*Primary Examiner* — Robert Pascal
*Assistant Examiner* — Khiem Nguyen
(74) *Attorney, Agent, or Firm* — WPAT PC; Justin King

(57) ABSTRACT

A touch panel comprises: a first conductive plate including a first substrate having a surface, a first conductive layer disposed on the surface of the first substrate and exhibiting an anisotropic resistivity, and at least one conductive first connecting line, the surface of the first substrate having a peripheral edge, a sensing region covered by the first conductive layer, and a marginal region extending from the sensing region to the peripheral edge, the first connecting line being disposed on the marginal region; and a second conductive plate including a second substrate and a second conductive layer disposed on the second substrate, facing the first conductive layer, and exhibiting anisotropic resistivity. An electronic device including the touch panel is also disclosed.

18 Claims, 8 Drawing Sheets

TOUCH PANEL AND ELECTRONIC DEVICE INCLUDING THE SAME

BACKGROUND

1. Technical Field

The present disclosure relates to a touch panel and an electronic device including the same, and more particularly to a touch panel including first and second conductive layers exhibiting electric anisotropy.

2. Description of Related Art

U.S. Pat. Nos. 4,672,153 and 4,897,511 disclose resistive type touch panels. Referring to FIG. 1, the touch panel includes first and second resistance layers 1, 2, two first electrodes 3a, 3b provided on two opposite ends of the first resistance layer 1, respectively, two second electrodes 4a, 4b provided on two opposite ends of the second resistance layer 2, respectively, and conductive connecting lines (not shown) connected to the first and second electrodes 3a, 3b, 4a, 4b. The first electrode 3b is applied with a high voltage $V^+$, while the second electrode 4b is grounded. When the first resistance layer 1 is depressed to contact the second resistance layer 2 at a contacting position (not shown), output voltages $V_x$ and $V_y$ of the first and second resistance layers 1, 2, which are greater than 0 and less than $V^+$, are produced, respectively. The coordinate of the contact position can be calculated based on the output voltages $V_x$ and $V_y$. Since the first and second resistance layers 1, 2 of the conventional touch panel are made from Indium Tin Oxide (ITO) having a surface resistivity ranging from 30 to 100Ω/□(ohms per square), the aforesaid touch panel is required to have a line resistance less than 15Ω in order to avoid measuring errors from occurring. The line resistance is largely contributed by the conductive connecting lines, which extend along marginal regions of the substrates. A current trend of the touch panel technology is towards the reduction of the width of the marginal regions of the substrates so as to maximize the size of a sensing region of each of the first and second conductive layers 1, 2. Although reduction of the line width of the conductive connecting lines can achieve the goal in maximizing the size of the sensing region, it undesirably increases the line resistance.

SUMMARY OF THE INVENTION

According to one aspect of the present invention, there is provided a touch panel that comprises: a first conductive plate including a first substrate having a surface, a first conductive layer disposed on the surface of the first substrate and exhibiting an anisotropic resistivity, and at least one first conductive connecting line, the surface of the first substrate having a peripheral edge, a sensing region covered by the first conductive layer, and a marginal region extending from the sensing region to the peripheral edge, the first connecting line being disposed on the marginal region; and a second conductive plate juxtaposed with the first conductive plate in a face-to-face manner and including a second substrate and a second conductive layer disposed on the second substrate, and facing the first conductive layer. The marginal region of the surface of the first substrate has a width ranging from about 100 μm to about 1 mm.

According to another aspect of the present invention, there is provided a touch panel that comprises: a first conductive plate including a first substrate having a surface, a first conductive layer disposed on the surface of the first substrate and exhibiting an anisotropic resistivity, and at least one first conductive connecting line, the surface of the first substrate having a peripheral edge, a sensing region covered by the first conductive layer, and a marginal region extending from the sensing region to the peripheral edge, the first connecting line being disposed on the marginal region; and a second conductive plate juxtaposed with the first conductive plate in a face-to-face manner and including a second substrate and a second conductive layer disposed on the second substrate, and facing the first conductive layer. The first connecting line has a line width ranging from about 50 to about 500 μm.

According to yet another aspect of the present invention, there is provided a touch panel that comprises: a first conductive plate including a first substrate having a surface, a first conductive layer disposed on the surface of the first substrate and made from a nanomaterial including a plurality of interconnected nanounits, and at least one first conductive connecting line, the surface of the first substrate having a peripheral edge, a sensing region covered by the first conductive layer, and a marginal region extending from the sensing region to the peripheral edge, the first connecting line being disposed on the marginal region; and a second conductive plate juxtaposed with the first conductive plate in a face-to-face manner and including a second substrate and a second conductive layer disposed on the second substrate, and facing the first conductive layer. The first conductive layer has a surface resistivity ranging from 1 to 800 kΩ/□.

According to yet another aspect of the present invention, there is provided an electronic device that comprises: an electronic module configured to process signals; and a touch panel coupled to the electronic module. The touch panel includes: a first conductive plate including a first substrate having a surface, a first conductive layer disposed on the surface of the first substrate and exhibiting an anisotropic resistivity, and at least one conductive first connecting line, the surface of the first substrate having a peripheral edge, a sensing region covered by the first conductive layer, and a marginal region extending from the sensing region to the peripheral edge, the first connecting line being disposed on the marginal region, and a second conductive plate juxtaposed with the first conductive plate in a face-to-face manner and including a second substrate and a second conductive layer disposed on the second substrate, and facing the first conductive layer. The marginal region of the surface of the first substrate has a width ranging from about 100 μm to about 1 mm.

According to yet another aspect of the present invention, there is provided an electronic device that comprises: an electronic module configured to process signals; and a touch panel coupled to the electronic module. The touch panel includes: a first conductive plate including a first substrate having a surface, a first conductive layer disposed on the surface of the first substrate and exhibiting an anisotropic resistivity, and at least one conductive first connecting line, the surface of the first substrate having a peripheral edge, a sensing region covered by the first conductive layer, and a marginal region extending from the sensing region to the peripheral edge, the first connecting line being disposed on the marginal region, and a second conductive plate juxtaposed with the first conductive plate in a face-to-face manner and including a second substrate and a second conductive layer disposed on the second substrate, and facing the first conductive layer. The first connecting line has a line width ranging from about 50 to about 500 μm.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various embodiments in detail.

Figure 1:
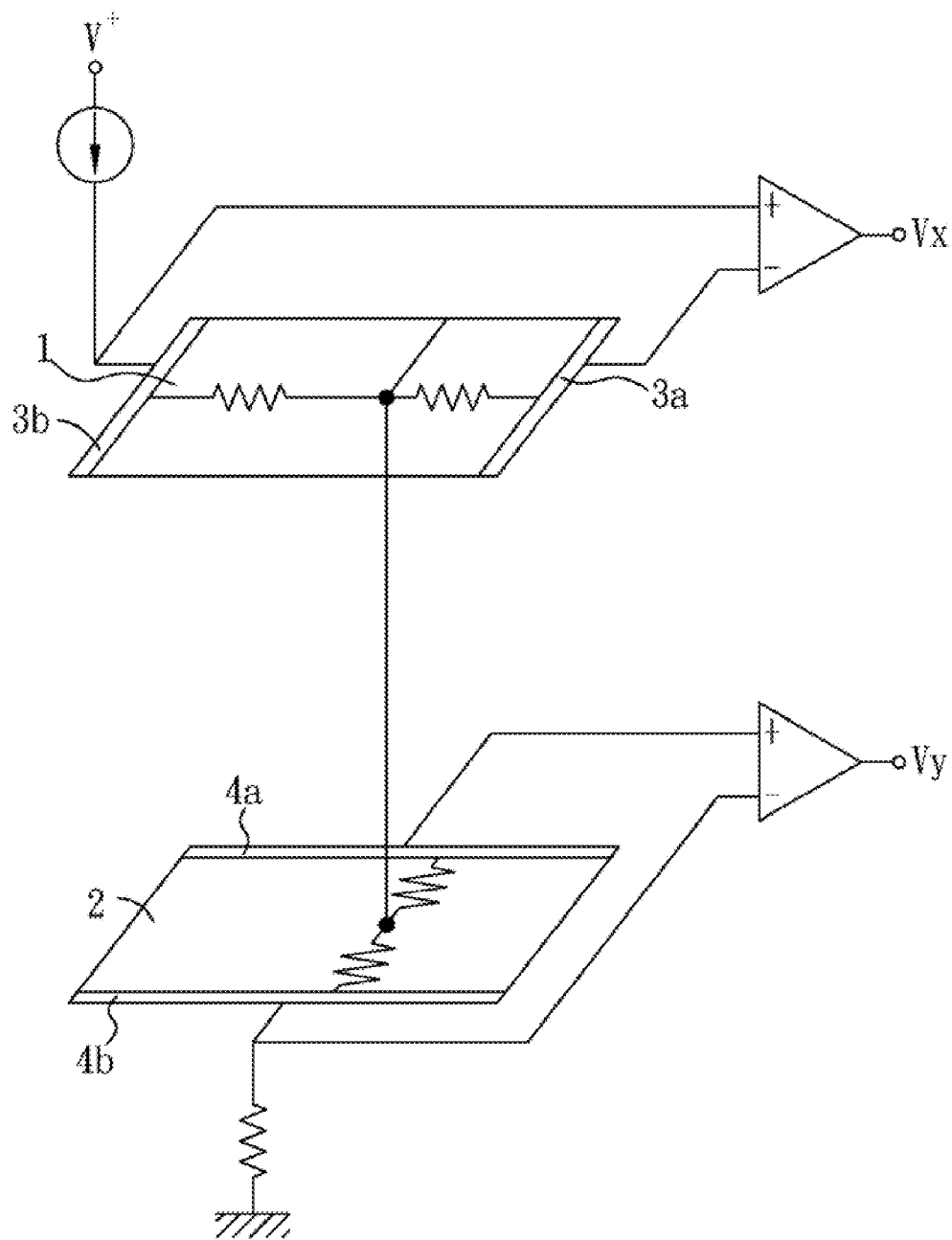
FIG. 1 is a schematic diagram showing a conventional touch panel.
Figure 2:
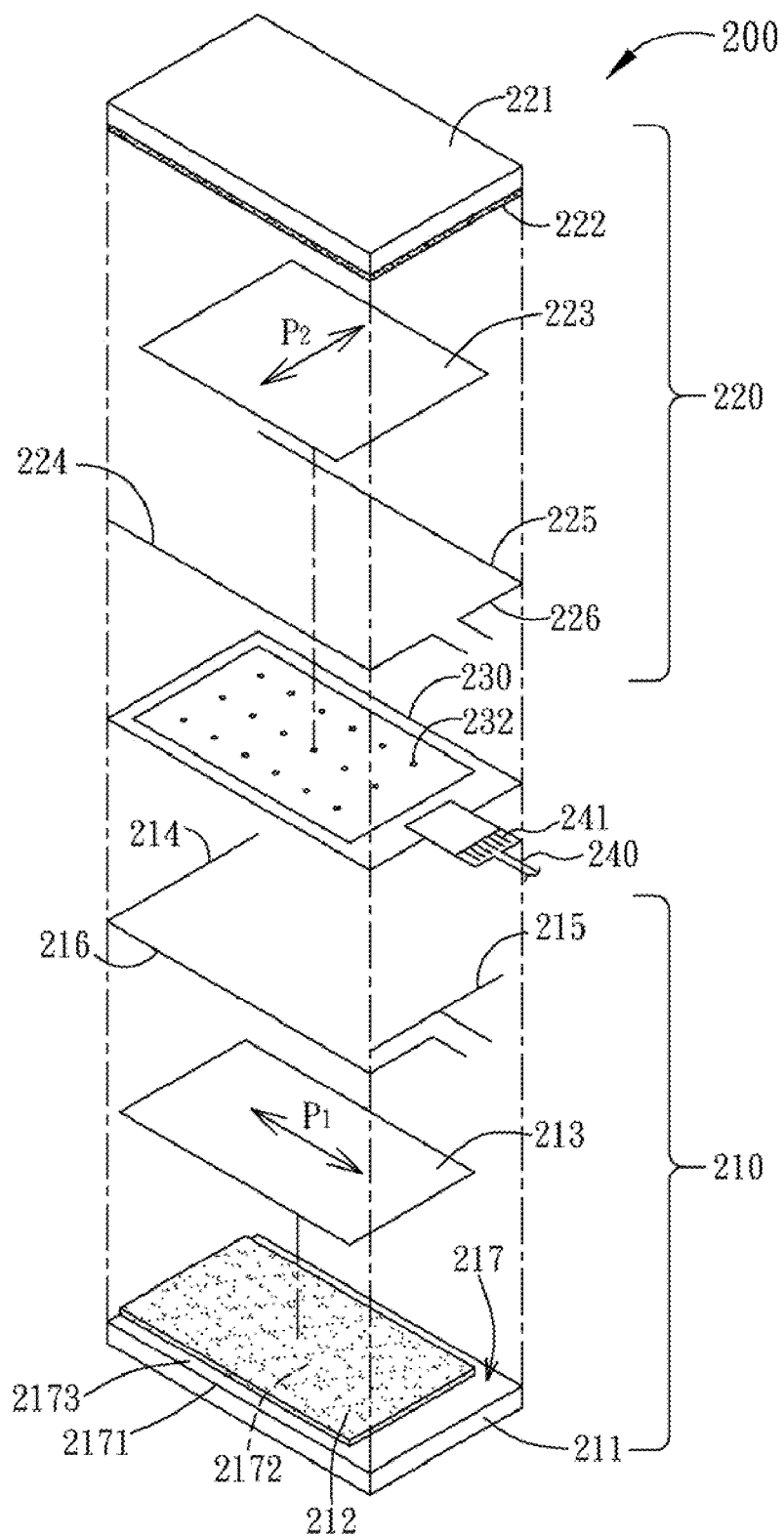
FIG. 2 is an exploded perspective view of the exemplary embodiment of a touch panel of the present disclosure.
Figure 3A:
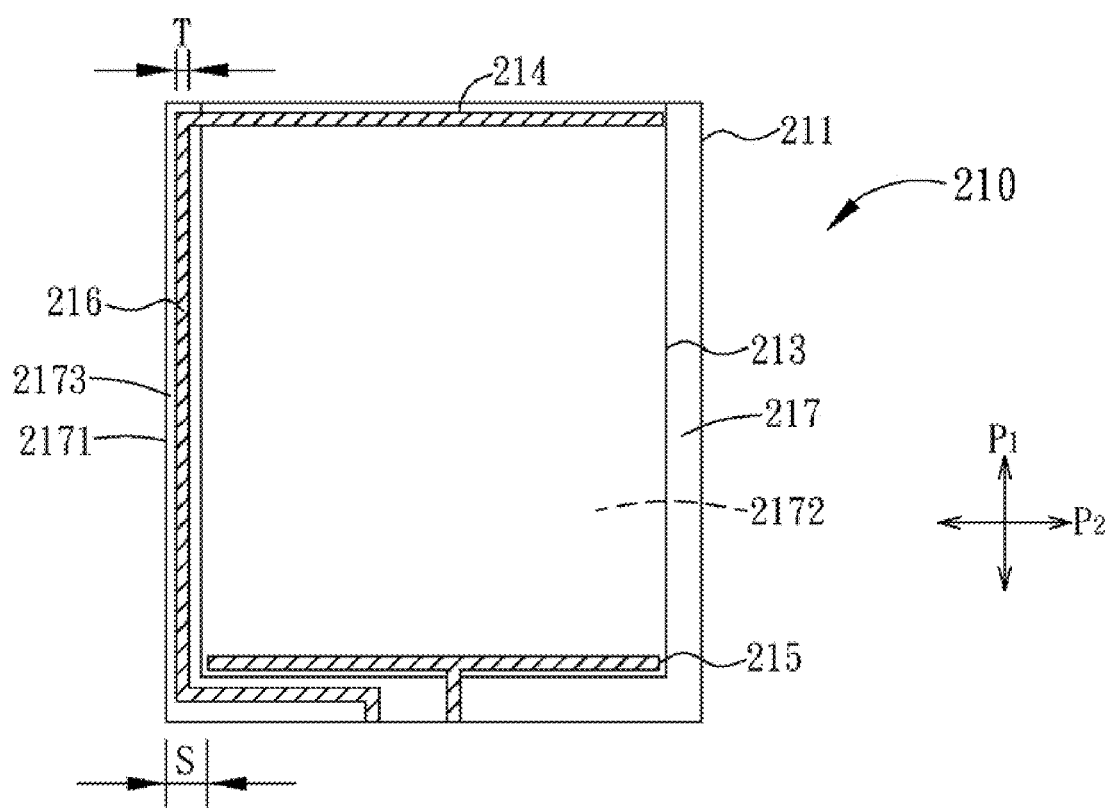
FIGS. 3A and 3B are top views illustrating the structures of first and second conductive plates of the exemplary embodiment, respectively.
Figure 3B:
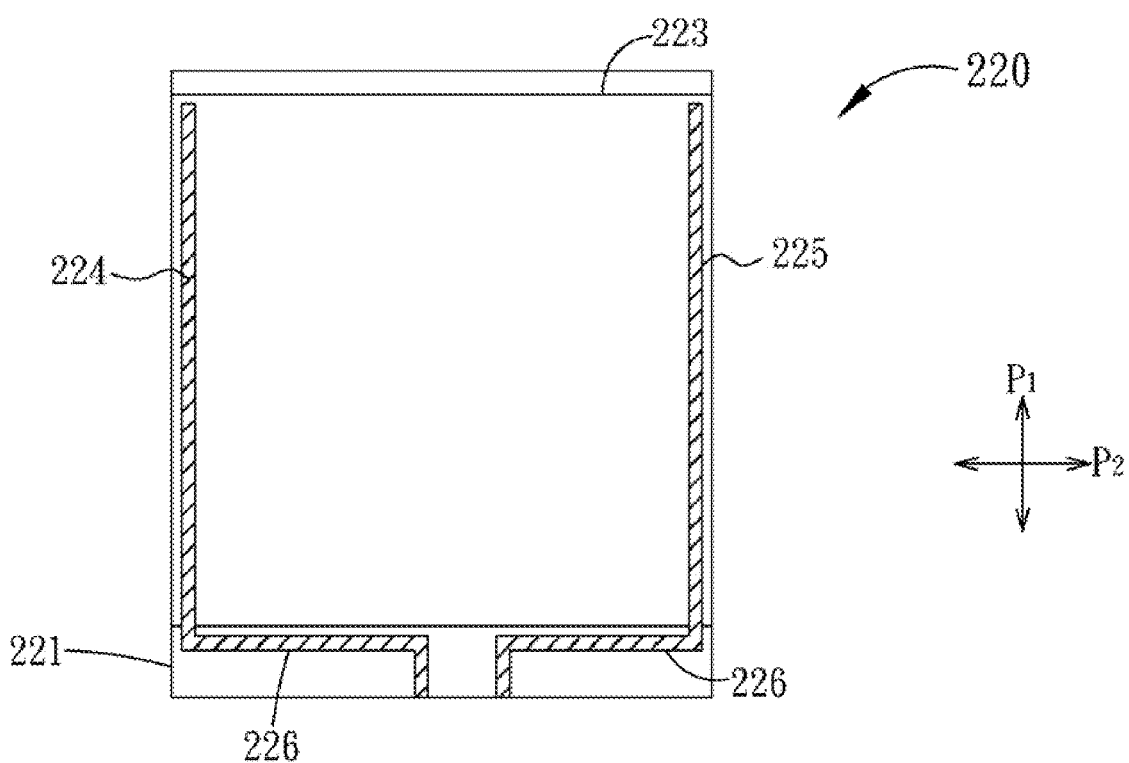

Referring to FIGS. 2 to 4, the exemplary embodiment of a touch panel 200 of the present disclosure includes first and second conductive plates 210, 220 that are separated from each other by a plurality of insulator spacers 232 disposed between and contacting the first and second conductive plates 210, 220, and that are framed and are firmly bonded together by a frame body 230.

The first conductive plate 210 includes a first substrate 211 having a surface 217, first and second electrodes 214, 215, a first conductive layer 213 disposed on and bonded to the surface 217 of the first substrate 211 through an adhesive layer 212, and at least one first conductive connecting line 216 connected to the first electrode 214 of the first conductive plate 210. The surface 217 of the first substrate 211 has a peripheral edge 2171, a sensing region 2172 covered by the first conductive layer 213, and a marginal region 2173 extending from the sensing region 2172 to the peripheral edge 2171. The first connecting line 216 is disposed on and extends along the marginal region 2173 of the surface 217 of the first substrate 211. The first conductive layer 213 has two opposite end portions opposite to each other in a first direction (P1). The first and second electrodes 214, 215 are disposed on the end portions of the first conductive layer 213, respectively, and extend in a second direction (P2) transverse to the first direction (P1).

The second conductive plate 220 is juxtaposed with the first conductive plate 210 in a face-to-face manner, and includes a second substrate 221 having a surface, first and second electrodes 224, 225, a second conductive layer 223 disposed on and bonded to the surface of the second substrate 221 through an adhesive layer 222 and facing the first conductive layer 213, and two conductive second connecting lines 226 connected to the first and second electrodes 224, 225, respectively. The second conductive layer 223 has two opposite end portions opposite to each other in the second direction (P2). The second and second electrodes 224, 225 are disposed on the end portions of the second conductive layer 223, respectively, and extend in the first direction (P1). The second connecting lines 226 are disposed on a lower marginal region of the surface of the second substrate 221.

A flexible printed circuit board 240 is bonded to the frame body 230, and includes a plurality of upper and lower metal contacts 241. The upper and lower metal contacts 241 are connected to the first and second connecting lines 216, 226, respectively, so as to connect electrically the first and second conductive plates 210, 220 to an external device (not shown).

The frame body 230 and the first and second adhesive layers 212, 222 can be made from a thermal curable adhesive or a UV curable adhesive.

Figure 4A:
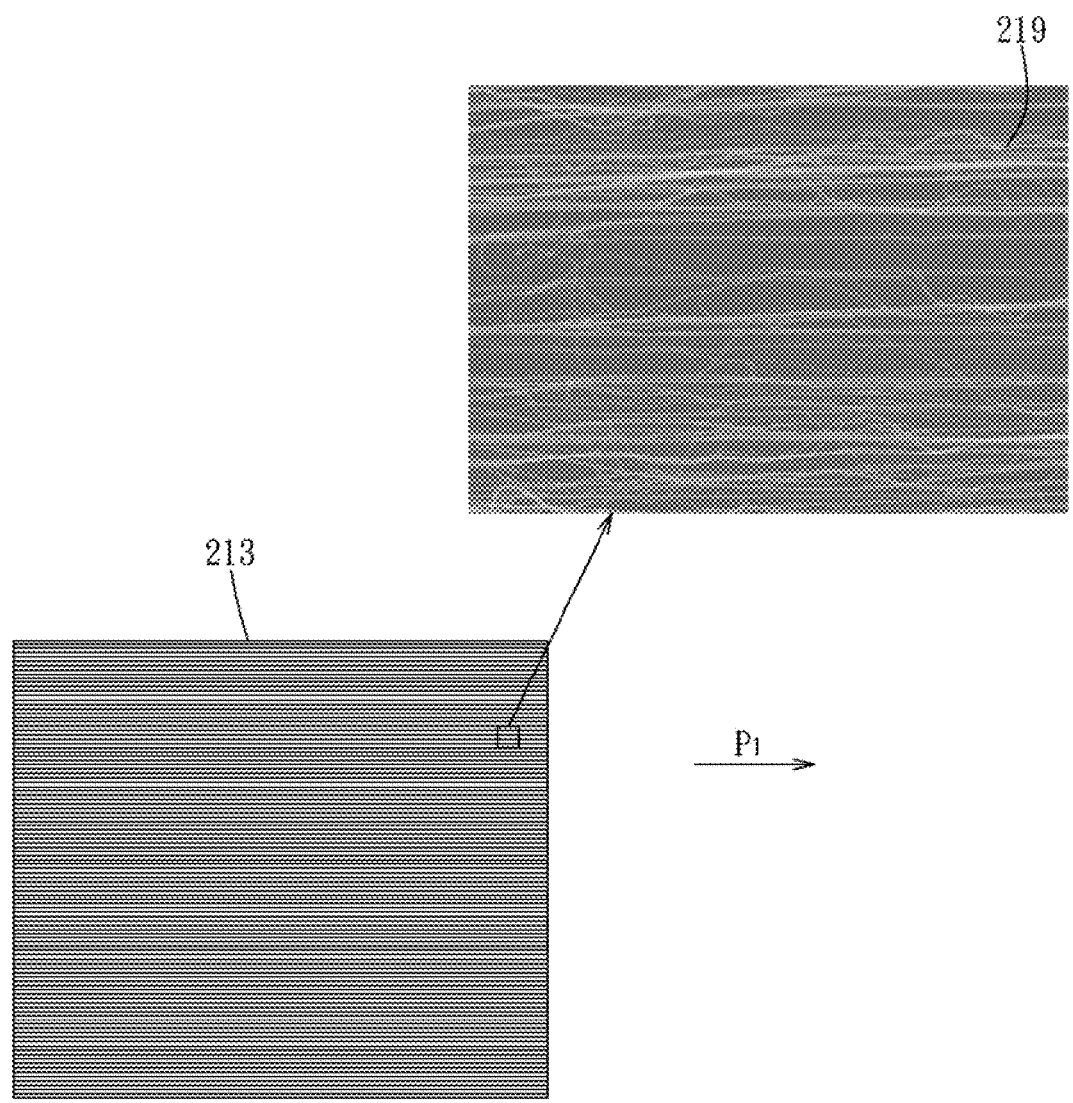
FIGS. 4A and 4B are plane views illustrating the structures of first and second conductive layers of the first and second conductive plates of the exemplary embodiment with SEM images, respectively.
Figure 4B:
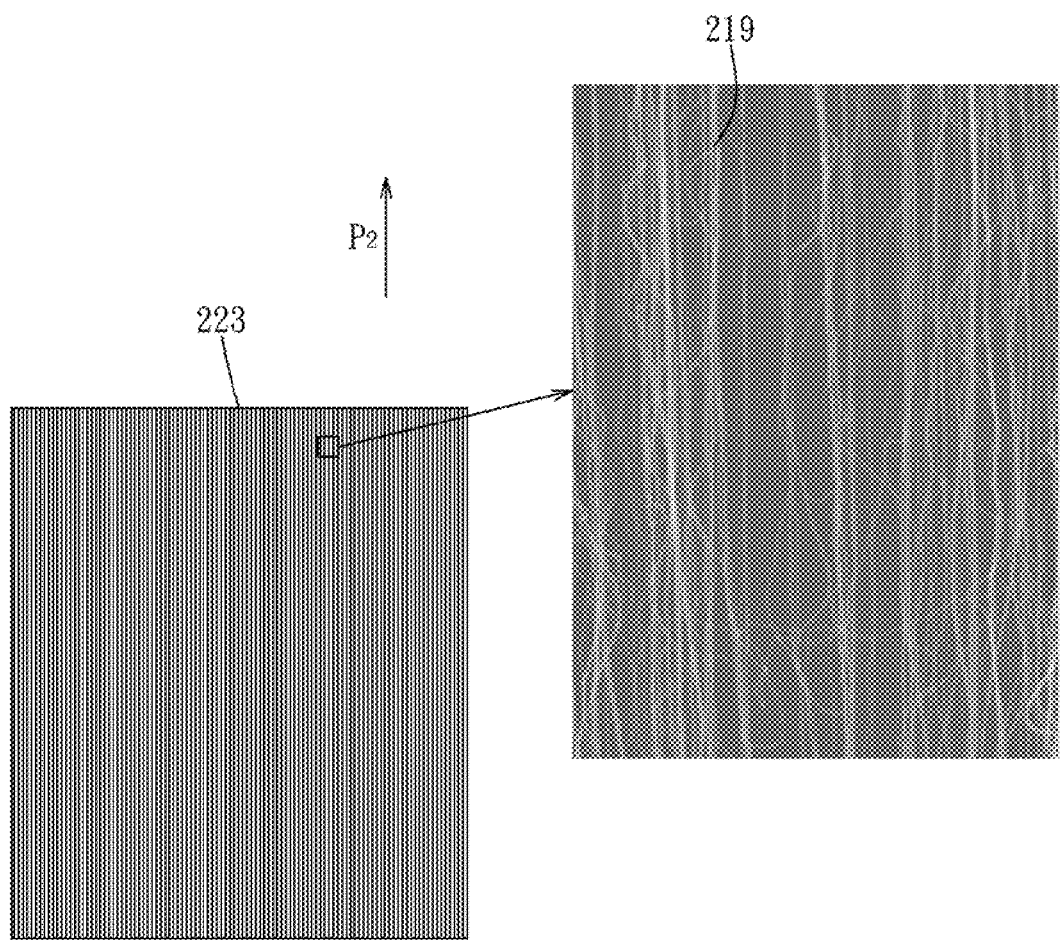

Referring to FIGS. 4A and 4B, in one exemplary embodiment, the first and second conductive layers 213, 223 are made from a nanomaterial including a plurality of nanounits. In the exemplary embodiment, the nanounits are carbon nanotube bundles 219. The carbon nanotube bundles 219 of the first conductive layer 213 substantially extend in the first direction (P1), and the carbon nanotube bundles 219 of the second conductive layer 223 substantially extend in the second direction (P2). Each of the first and second conductive layers 213, 223 has a surface resistivity ranging from 1 to 800 k$\Omega$/$\square$, and exhibit anisotropic resistivity such that each of the first and second conductive layers 213, 223 has a first resistivity in the first direction (P1) and a second resistivity in the second direction (P2). The ratio of the second resistivity of the first conductive layer 213 to the first resistivity of the first conductive layer 213 ranges from about 100:1 to about 200:1, and the ratio of the first resistivity of the second conductive layer 223 to the second resistivity of the second conductive layer 223 ranges from about 100:1 to about 200:1. In one exemplary embodiment, the first and second resistivities of the first conductive layer 213 range from 3 to 5 k$\Omega$/$\square$ and from 250 to 600 k$\Omega$/$\square$, respectively, and the first and second resistivities of the second conductive layer 223 range from 250 to 600 k$\Omega$/$\square$ and from 3 to 5 k$\Omega$/$\square$, respectively. Since the surface resistivity of each of the first and second conductive layers 213, 223 is much higher than those of the resistance layers 1, 2 of the aforesaid touch panel made from ITO, the line resistance contributed largely by the first and second connecting lines 216, 226 can be allowed to be increased in proportion without increasing measuring errors as referring to the formula disclosed by TW 200920689. Thereby permits the reduction of the width of the marginal region 2173 of the surface 217 of the first substrate 211 and the width of the lower marginal region of the surface of the second substrate 221, which permits an increase in the sensing region 2172 of the first substrate 211 and the sensing region of the second substrate 221.

The use of the carbon nanotube bundles as the material for the first and second conductive layers 213, 223 permits each of the first and second connecting lines 216, 226 to have a line width (T) ranging from about 50 to about 500 μm, and the marginal region 2173 of the surface 217 of the first substrate 211 to have a width (S) ranging of from about 100 μm to about 1 mm. In one exemplary embodiment, the line width of each of the first and second connecting lines 216, 226 is 100 μm, and the width of the marginal region 2173 of the surface 217 of the first substrate 211 is 500 μm.

Figure 5:
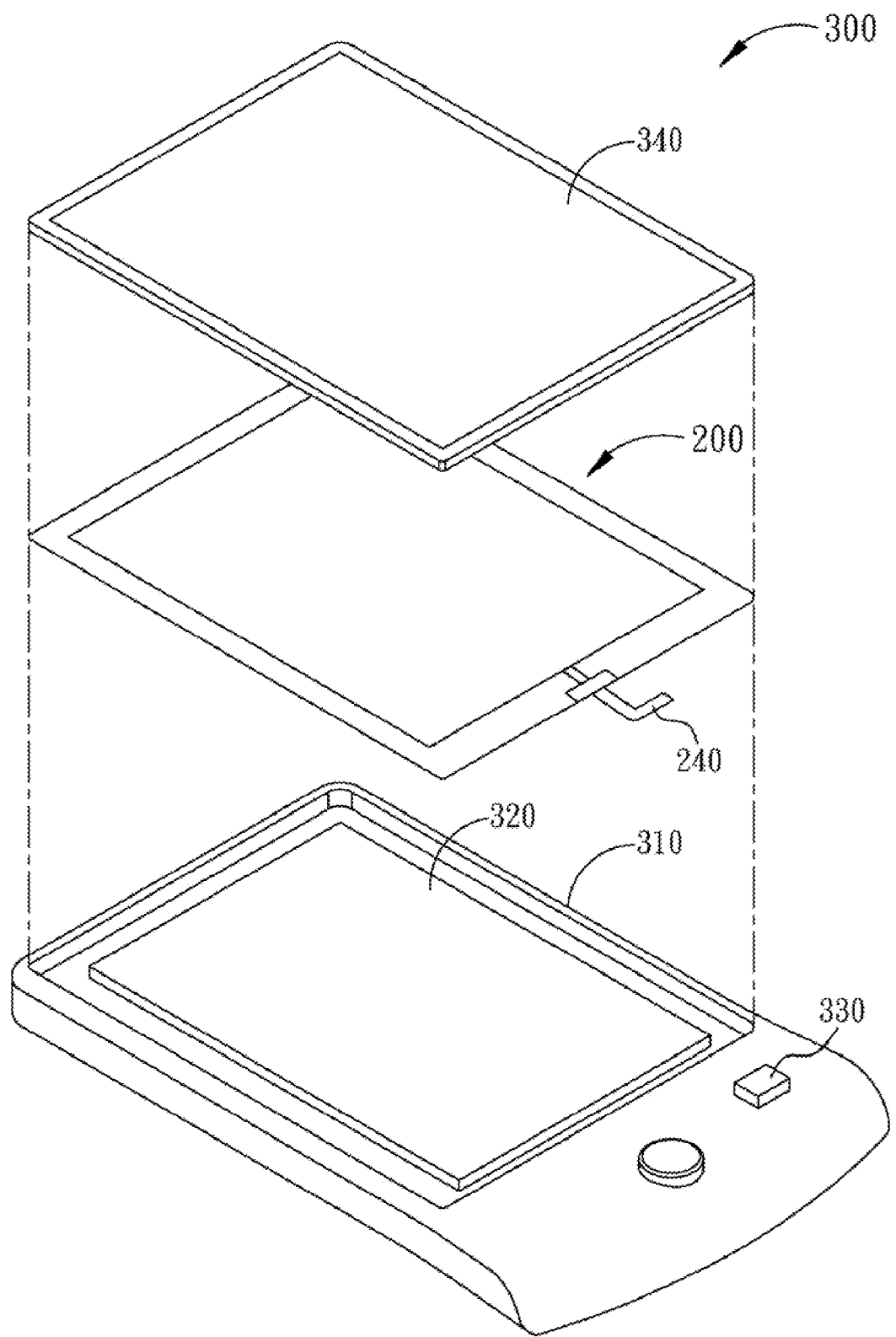
FIG. 5 is an exploded perspective view illustrating the configuration of an electronic device including the exemplary embodiment of FIG. 2.

FIG. 5 illustrates an electronic device 300 of a mobile phone including an electronic module 310 configured to process signals and having a housing and a screen 320, and a touch panel 200 of the exemplary embodiment of FIG. 2 stacked on the screen 320 and coupled electrically to a connector 330 of the electronic module 310 through a flexible printed circuit board 240 for performing touch sensing functions. A decorative plate 340 is stacked on the touch panel 200, and has a transparent region corresponding to the sensing region 2172 of the substrate 211, and an opaque region corresponding to the marginal region 2173 of the substrate 211 for covering the first connecting line 216. With the inclusion of the touch panel 200 of the present embodiment in the electronic device 300, the size of the screen 320 used in the electronic device 300 can be increased as compared to the aforementioned conventional touch panel.

Figure 6:
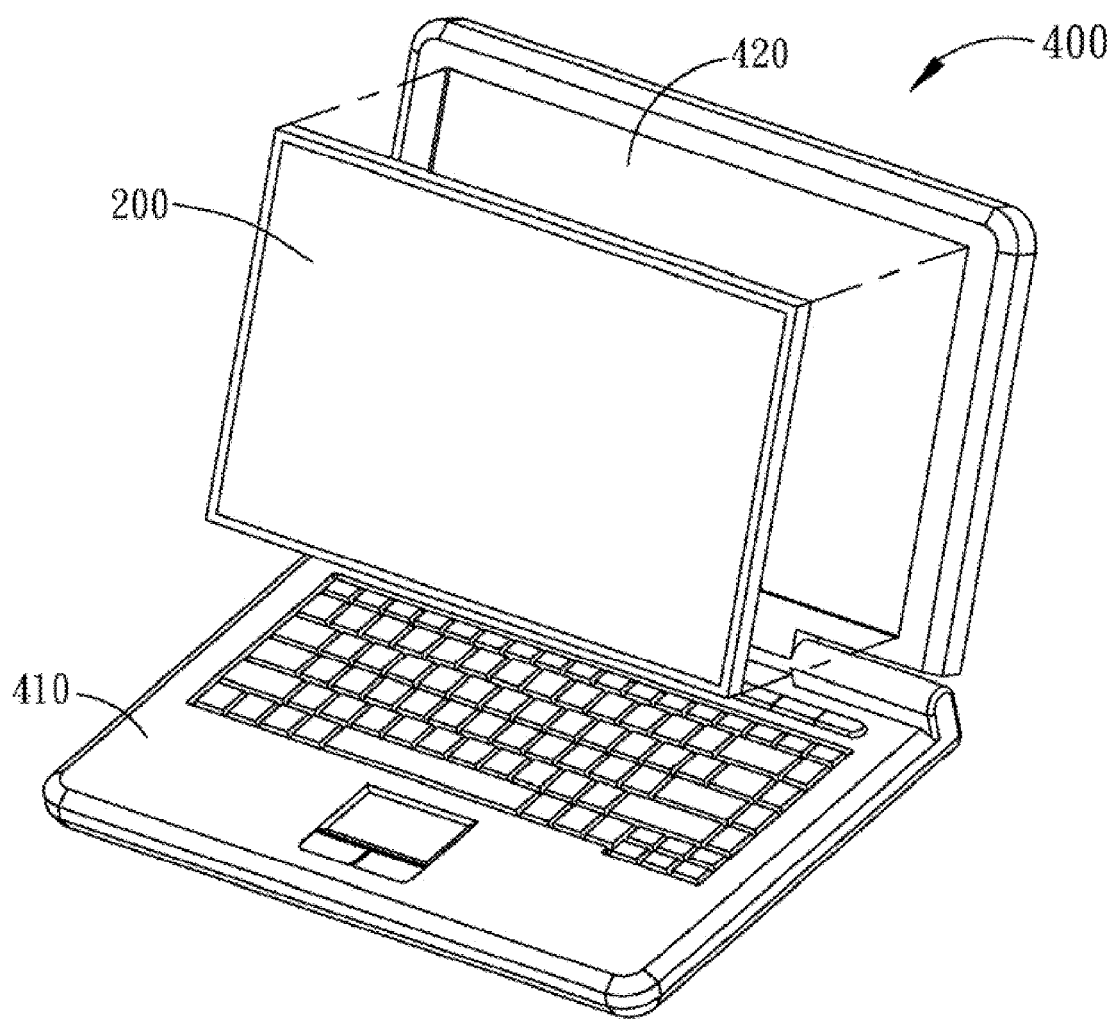
FIG. 6 is an exploded perspective view illustrating the configuration of another electronic device including the exemplary embodiment of FIG. 2.

FIG. 6 illustrates an electronic device 400 of a notebook computer including an electronic module 410 with a housing, a display panel 420 having a screen and pivoted to the housing of the electronic module 410 so as to be movable relative to the housing, and a touch panel 200 of the exemplary embodiment of FIG. 2 stacked on the screen of the display panel 420.

The first and second substrates 211, 221 as shown in FIG. 2 can be made from polyethylene (PE), polycarbonate (PC), polyethylene terephthalate (PET), polymethylmethacrylate (PMMA), or glass, for example. The first and second substrates 211, 221 can be transparent or opaque, and can be coated with a colored coating to become opaque.

It is to be understood that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts, within the principles of the embodiments, to the full extent indicated by the broad general meaning of the terms in which the appended claims are expressed.

What is claimed is:

1. A touch panel, comprising:
a first conductive plate including a first substrate having a surface, a first conductive layer disposed on said surface of said first substrate and exhibiting anisotropic resistivity, and at least one first conductive connecting line, said surface of said first substrate having a peripheral edge, a sensing region covered by said first conductive layer, and a marginal region extending from said sensing region to said peripheral edge, said first connecting line being disposed on said marginal region;
a second conductive plate juxtaposed with said first conductive plate in a face-to-face manner and including a second substrate and a second conductive layer disposed on said second substrate, and facing said first conductive layer;
wherein said marginal region of said surface of said first substrate has a width ranging from about 100 μm to about 1 mm and each of said first and second conductive layers has a first resistivity in a first direction and a second resistivity in a second direction transverse to the first direction, the ratio of said second resistivity of said first conductive layer to said first resistivity of said first conductive layer ranging from about 100:1 to about 200:1, the ratio of said first resistivity of said second conductive layer to said second resistivity of said second conductive layer ranging from about 100:1 to about 200:1 thereby permitting the reduction of a width of said marginal region of said surface of said first substrate, which permits an increase in said sensing region of said first substrate.

2. The touch panel of claim 1, wherein each of said first and second conductive layers includes carbon nanotube bundles, said carbon nanotube bundles of said first conductive layer substantially extending in the first direction, said nanotube bundles of said second conductive layer substantially extending in the second direction transverse to the first direction.

3. The touch panel of claim 1, wherein said first connecting line has a line width ranging from about 50 to about 500 μm.

4. The touch panel of claim 1, wherein said first conductive layer has two opposite end portions opposite to each other in the first direction, said first conductive plate further including first and second electrodes disposed on said end portions of said first conductive layer, respectively, and extending in the second direction.

5. The touch panel of claim 4, wherein said first electrode is connected to said first connecting line.

6. The touch panel of claim 4, wherein said second conductive layer has two opposite end portions opposite to each other in the second direction, said second conductive plate further including first and second electrodes disposed on said end portions of said second conductive layer, respectively, and extending in the first direction.

7. The touch panel of claim 6, wherein said second conductive plate further includes a second conductive connecting line connected to said first electrode of said second conductive plate.

8. The touch panel of claim 1, wherein said first and second conductive plates further include first and second adhesive layers, respectively, said first and second conductive layers being bonded to said first and second substrates through said first and second adhesive layers, respectively.

9. The touch panel of claim 1, further comprising a frame body adhesively bonded to said first and second conductive plates so as to frame and bond firmly said first and second conductive plates together.

10. The touch panel of claim 1, further comprising a plurality of insulator spacers disposed between and in contact with said first and second conductive plates so as to separate said first and second conductive plates from each other.

11. The touch panel of claim 1, wherein each of said first and second conductive layers has a surface resistivity ranging from 1 to 800 kΩ/□.

12. The touch panel of claim 1, wherein said second conductive layer exhibits electric anisotropy.

13. A touch panel, comprising:
a first conductive plate including a first substrate having a surface, a first conductive layer disposed on said surface of said first substrate and exhibiting an anisotropic resistivity, and at least one first conductive connecting line, said surface of said first substrate having a peripheral edge, a sensing region covered by said first conductive layer, and a marginal region extending from said sensing region to said peripheral edge, said first connecting line being disposed on said marginal region; and
a second conductive plate juxtaposed with said first conductive plate in a face-to-face manner and including a second substrate and a second conductive layer disposed on said second substrate, and facing said first conductive layer;
wherein said first connecting line has a line width ranging from about 50 to about 500 μm and each of said first and second conductive layers has a first resistivity in a first direction and a second resistivity in a second direction transverse to the first direction, the ratio of said second resistivity of said first conductive layer to said first resistivity of said first conductive layer ranging from about 100:1 to about 200:1, the ratio of said first resistivity of said second conductive layer to said second resistivity of said second conductive layer ranging from about 100:1 to about 200:1 thereby permitting the reduction of a width of said marginal region of said surface of said first substrate, which permits an increase in said sensing region of said first substrate.

14. A touch panel, comprising:
a first conductive plate including a first substrate having a surface, a first conductive layer disposed on said surface of said first substrate and made from a nanomaterial including a plurality of interconnected nanounits, and at least one first conductive connecting line, said surface of said first substrate having a peripheral edge, a sensing region covered by said first conductive layer, and a marginal region extending from said sensing region to said peripheral edge, said first connecting line being disposed on said marginal region; and a second conductive plate juxtaposed with said first conductive plate in a face-to-face manner and including a second substrate and a second conductive layer disposed on said second substrate, and facing said first conductive layer;

wherein said first conductive layer has a surface resistivity ranging from 1 to 800 kΩ/□, said marginal region of said surface of said first substrate has a width ranging from about 100 μm to about 1 mm and each of said first and second conductive layers has a first resistivity in a first direction and a second resistivity in a second direction transverse to the first direction, the ratio of said second resistivity of said first conductive layer to said first resistivity of said first conductive layer ranging from about 100:1 to about 200:1, the ratio of said first resistivity of said second conductive layer to said second resistivity of said second conductive layer ranging from about 100:1 to about 200:1 thereby permitting the reduction of a width of said marginal region of said surface of said first substrate, which permits an increase in said sensing region of said first substrate.

15. An electronic device, comprising:
an electronic module configured to process signals; and
a touch panel coupled to said electronic module and including
a first conductive plate including a first substrate having a surface, a first conductive layer disposed on said surface of said first substrate and exhibiting an anisotropic resistivity, and
a second conductive plate juxtaposed with said first conductive plate in a face-to-face manner and including a second substrate and a second conductive layer disposed on said second substrate, and facing said first conductive layer;
wherein said marginal region of said surface of said first substrate has a width ranging from about 100 μm to about 1 mm and each of said first and second conductive layers has a first resistivity in a first direction and a second resistivity in a second direction transverse to the first direction, the ratio of said second resistivity of said first conductive layer to said first resistivity of said first conductive layer ranging from about 100:1 to about 200:1, the ratio of said first resistivity of said second conductive layer to said second resistivity of said second conductive layer ranging from about 100:1 to about 200:1 thereby permitting the reduction of a width of said marginal region of said surface of said first substrate, which permits an increase in said sensing region of said first substrate.

16. The electronic device of claim 15, wherein each of said first and second conductive layers has a surface resistivity ranging from 1 to 800 kΩ/□.

17. An electronic device, comprising:
an electronic module configured to process signals;
a touch panel coupled to said electronic module and including
a first conductive plate including a first substrate having a surface, a first conductive layer disposed on said surface of said first substrate and exhibiting an anisotropic resistivity, and at least one conductive first connecting line, said surface of said first substrate having a peripheral edge, a sensing region covered by said first conductive layer, and a marginal region extending from said sensing region to said peripheral edge, said first connecting line being disposed on said marginal region, and
a second conductive plate juxtaposed with said first conductive plate in a face-to-face manner and including a second substrate and a second conductive layer disposed on said second substrate, and facing said first conductive layer;
wherein said first connecting line has a line width ranging from about 50 to about 500 μm and each of said first and second conductive layers has a first resistivity in a first direction and a second resistivity in a second direction transverse to the first direction, the ratio of said second resistivity of said first conductive layer to said first resistivity of said first conductive layer rangy from about 100:1 to about 200:1, the ratio of said first resistivity of said second conductive layer to said second resistivity of said second conductive layer ranging from about 100:1 to about 200:1 thereby permitting the reduction of a width of said marginal region of said surface of said first substrate, which permits an increase in said sensing region of said first substrate.

18. The electronic device of claim 17, wherein each of said first and second conductive layers has a surface resistivity ranging from 1 to 800 kΩ/□.

* * * * *